Aug. 23, 1932.  J. V. GIESLER  1,873,703
EXPANSION JOINT
Filed Feb. 9, 1929
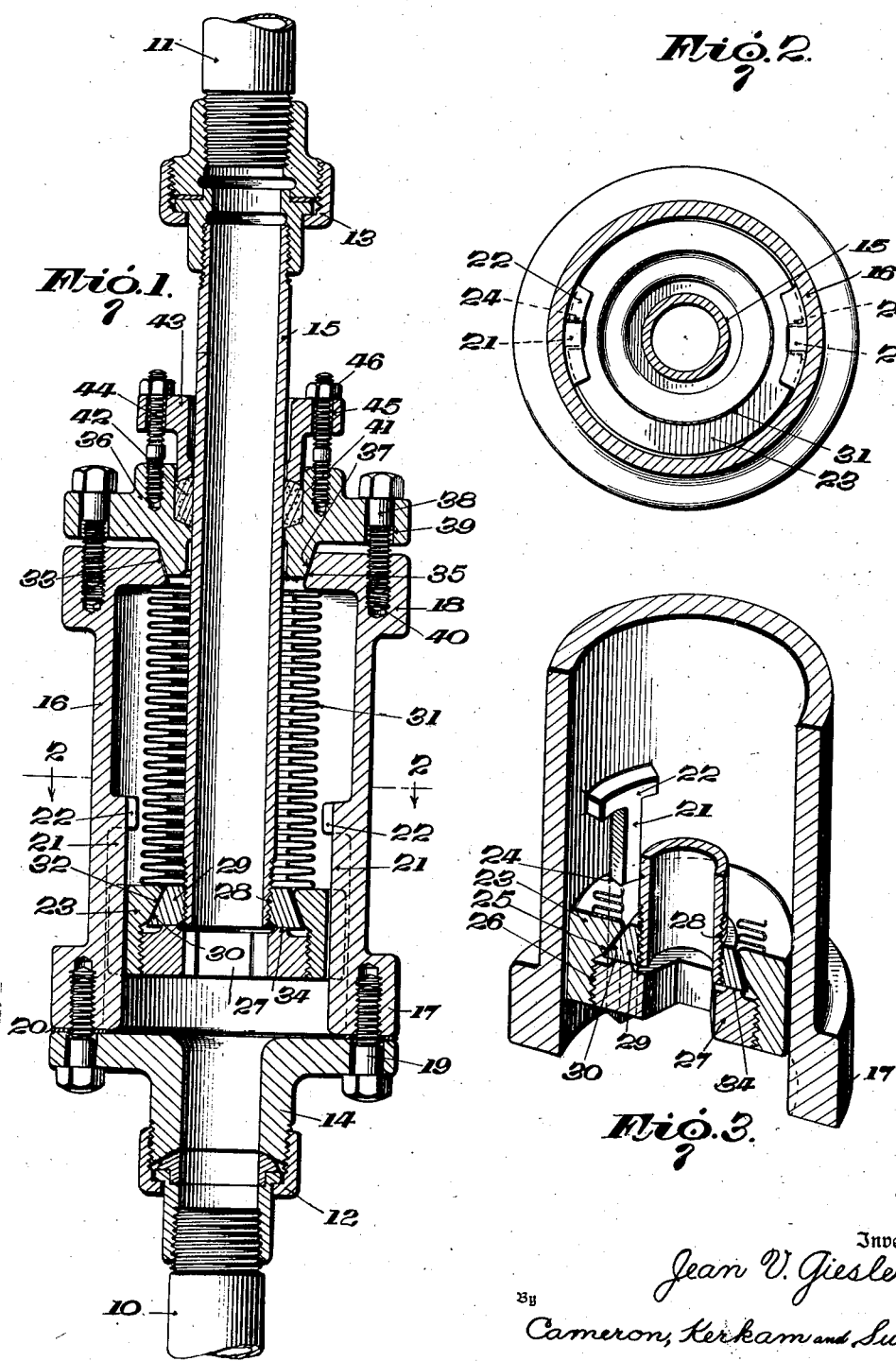
Inventor
Jean V. Giesler.
By
Cameron, Kerkam and Sutton.
Attorneys Patented Aug. 23, 1932

1,873,703

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

EXPANSION JOINT

Application filed February 9, 1929. Serial No. 338,821.

This invention relates to expansion joints. Various constructions of expansion joints employing highly flexible, deeply corrugated, tubular metal walls as fluid-tight partitions between the relatively movable elements of the joints have heretofore been proposed, such constructions usually subjecting the interior of such flexible wall to the pressure of the fluid conveyed by the elements between which the joint is disposed, but it has also been proposed to subject such flexible wall exteriorly to the pressure of said fluid by constructions which have possessed numerous disadvantages among which may be noted the difficulty of maintaining a proper alignment and the difficulty of access to and replacement of the flexible wall in the event that such becomes necessary.

It is an object of this invention to provide an expansion joint employing a highly flexible, deeply corrugated, tubular metal wall as a fluid-tight partition between the relatively movable elements of the joint wherein said flexible wall is exteriorly subjected to the pressure of the confined fluid and which is so constructed as to assure proper alignment of the elements of the joint at all times.

Another object of this invention is to provide an expansion joint of the type characterized which is so constructed that access may be readily gained to said flexible wall, and said wall replaced when necessary.

Another object of this invention is to provide an expansion joint of the type characterized which is provided with means to prevent the exertion of destructive torsional forces on the flexible wall when the joint is in operation.

Another object of this invention is to provide a flexible joint of the type characterized with means whereby, in the event that there is a rupture of the flexible walls, the joint does not require immediate replacement or repair, with the consequent throwing out of service of the line in which the joint is disposed, but the joint may be continued in service until such time as it is convenient to replace the flexible wall.

Other objects will appear as the description of the invention proceeds.

The invention is capable of receiving a variety of mechanical expressions, one of which is shown on the accompanying drawing, and it is to be expressly understood that the drawing is for purposes of illustration only and is not to be construed as a definition of the limits of the invention, reference being had to the appended claims for that purpose.

Referring in detail to the drawing wherein the same reference characters are employed to designate the corresponding parts in the several figures, Fig. 1 is an axial section of an embodiment of the present invention;

Fig. 2 is a transverse section on the line 2—2 of Fig. 1; and

Fig. 3 is a sectional perspective elevation of the joint housing and the parts contained therein.

In the form shown, 10 and 11 designate pipes in any suitable line in which the expansion joint is to be disposed, said pipes being shown as threaded at their ends and respectively connected by unions 12 and 13, of any suitable construction, to a flanged nipple 14 and a pipe section 15. Said pipe section 15 is received telescopically within a housing 16, of any suitable size, construction and material, said housing being provided with flanges 17 and 18 at or adjacent to its opposite extremities. Flange 17 has a plurality of screw holes, whereby the flanged nipple 14 may be attached thereto by a corresponding number of machine screws 19 inserted through apertures in the flange of said nipple. The flange of said nipple is designed to make a fluid-tight joint with the housing 16, and as shown packing 20 is interposed between the adjacent surfaces of said housing and flanged nipple, and retained in position by the machine screws 19.

The interior of said housing 16 is provided with one or more, preferably a plurality of axially extending ribs 21 which extend inwardly from the end of the housing attached to the flanged nipple for approximately one-half the length of said housing. The inner end of each of said ribs 21 is provided with a transverse or circumferentially extending segmental ribs or lug 22, although if desired the inner ends of said ribs 21 may be connected by a circumferentially extending rib which extends throughout the circumference of the inner wall of the housing.

Slidably mounted on said axially extending ribs 21 is an annular head 23 provided with axially extending grooves 24 which correspond in number and shape with the ribs 21, and which are designed to have a fairly close sliding fit therewith. Said head 23 is provided with a conical annular surface 25 and an interiorly threaded portion 26 of larger diameter designed to receive an annular nut 27.

Pipe section 15 is designed to extend within the head 23 and is threaded at its inner end as shown at 28 to receive a head 29 having a conical exterior surface 30, said head being designed to be secured on the pipe 15 in fixed relation thereto and to this end it may be soldered thereon or secured permanently thereto in any other suitable way. The surface 30 of the head 29 has the same conicity as the inner surface 25 of the head 23.

The fluid-tight partition between the relatively movable elements 15 and 16 is constituted by a deeply corrugated, highly flexible, tubular metal wall 31, said wall at its opposite extremities being provided with extensions 32 and 33. Extension 32 is designed to be received and gripped between the conical surfaces 25 and 30 on the heads 23 and 29, respectively, the surface 30 being forced into contact with the extension 32 to grip the same tightly against the surface 25, and form a fluid-tight contact therewith, by the nut 27 which, if desired, may be provided with an annular rib 34 for contact with the head 29, so as to reduce the exertion of torque, when the ring nut 27 is set up tightly to force the conical surfaces 25 and 30 to grip the extension 32 on the flexible wall to form a fluid-tight contact.

The opposite extremity 18 of the housing 16 is provided with a central aperture having a conically flared surface 35 to receive the extension 33 on the flexible wall 31 and said extension is gripped tightly against the conical surface 35, to form a fluid-tight contact therewith, by a flanged ring 36 having an interiorly projecting hub provided with a conical surface 37 of the same conicity as the surface 35. Flanged ring 36 may be secured to the enlarged or flanged extremity 18 of the casing 16 in any suitable way, as by a plurality of machine screws 38 passing through apertures 39 in flanged ring 36 and threaded into tapped holes 40 in the extremity 18 of the housing 16.

It sometimes happens that owing to the ingredients of the fluid being conveyed by the pipe sections in which the expansion joint is disposed, or for other reasons, the flexible partition wall 31 may be eaten through or may become ruptured, and this may occur at a time when it is highly inconvenient to take the line out of service in order to replace the flexible wall. In accordance with the present invention the expansion joint is provided with means whereby the joint may continue to function until such time as it is convenient to replace the flexible wall. To this end, the flanged ring 36 is recessed at 41 to receive packing 42 of any suitable character, and surrounding pipe 15 is a gland 43, of any suitable construction. The flanged ring 36 carries a plurality of bolts 44 designed to pass through apertures 45 in the gland 43 and receive nuts 46 whereby the gland may be tightened to any desired extent to impose the desired compression upon the packing 42.

In operation the head 23 which is rigidly clamped to the pipe section 15 may slide back and forth on the ribs 21, said ribs 21 and the coacting grooves 24 constituting keys and keyways between the relatively movable members 16 and 15, the extent of motion being limited by contact with the circumferentially extending ribs 22, at one extremity of the range of motion, and by contact with the flanged nipple 14, at the opposite extremity of the range of motion.

The head 23 is of sufficient axial extent to prevent the pipe 15, secured thereto, from getting out of alignment with the axis of the housing 16 and the pipe section to which it is attached, and at the same time, the rib and groove connection between the housing 16 and head 23 assures against relative rotation between said head and housing, to prevent the exertion of a torque on the flexible wall 31 during the operation of the joint and the relative movement between the parts thereof. The rib and groove connection between the housing and head also facilitates easy relative movement between the same, between the limits which are definitely fixed, without likelihood of the head 23 getting out of alignment and cramping within the housing.

The pressure of the fluid conveyed by the pipes in which the expansion joint is disposed is applied to the flexible wall 31 only exteriorly thereof, the fluid reaching the chamber within the housing 16 exteriorly of the flexible wall 21 through the slight clearance spaces around the periphery of the head 23 and between the grooves 24 and ribs 21, although if desired an aperture may be provided in the body or the periphery of the head 23 to facilitate the passage of fluid under pressure into said chamber. In any event, the chamber within the flexible wall 31 is sealed against the admission of the fluid thereto, and the pressure of the fluid is applied only to the exterior of the flexible wall. Experience has demonstrated that a deeply corrugated, tubular metal wall is less subject to buckling or bulging when subjected to pressure exteriorly than when subjected to pressure interiorly, and hence the exterior application of the pressure to the flexible wall assures that the flexible wall shall maintain its alignment and the expansion and contraction of the flexible wall will be purely rectilineal.

When the expansion joint is installed the packed joint 42, 43 may be or may not be set up to constitute a fluid-tight joint as desired, but it is preferred to tighten the packing sufficiently so that the pipe 15 shall have bearing engagement therewith, to the end that the relatively movable elements 15 and 16 shall thereby have two points of relative support for assuring pure rectilinear motion and alignment between the parts. In the event that the flexible wall 31 shall leak, the packed joint 42, 43 may be tightened, if it is not already a fluid-tight joint, and thereby leakage from the expansion joint be prevented until such time as it is desired to replace the flexible wall. Therefore, it is not necessary to take the pressure off of the line and replace the flexible wall as soon as a leak occurs—as in constructions heretofore provided.

It will also be perceived that the expansion joint of the present invention enables ready access to and replacement of the flexible wall, because the flexible wall is not soldered or otherwise permanently attached to any of the elements of the joint. By backing off the ring nut 27 the heads 23 and 29 may be readily separated to disconnect the end 32 of the flexible wall therefrom, and similarly the opposite end 33 of the flexible wall may be readily disconnected by removing the machine screws 38 and the flanged ring 36. The flexible wall may be readily assembled with the other elements of the joint, either initially or as a repair, by inserting the extensions 32 and 33 of the flexible wall, which extensions may be cylindrical or slightly flared as desired, within the apertures of the head 23 and end 18, and thereafter expanding said extensions into fluid-tight contact with the surrounding conical surfaces by forcing the head 29 into contact therewith, by tightening up the ring nut 27, and by forcing the hub on the flanged ring 36 into contact therewith, by tightening up the machine screws 38.

It will, therefore, be perceived that an expansion joint has been provided wherein the fluid-tight partition is constituted by a corrugated, highly flexible, tubular metal wall which is exteriorly subjected to the pressure of the confined fluid and which joint is easy to assemble and disassemble, facilitating access to and repair of the flexible wall, while assuring that the parts of the joint shall be maintained in alignment. At the same time, the construction is such as to prevent the exertion of a destructive torque on a flexible wall, and, in the event that the flexible wall develops a leak, the joint may be continued in service until such time as it is convenient to replace the flexible wall. The expansion joint is, moreover, of simple and rugged construction and composed of parts which are inexpensive to manufacture, so that the joint is both durable and efficient.

While the embodiment of the invention illustrated on the drawing has been described with considerable particularity, it is to be expressly understood that the invention is not restricted thereto as the invention is capable of receiving a variety of mechanical expressions, some of which will now readily suggest themselves to those skilled in the art, while changes may be made in the details of construction, arrangement and proportion of parts, and certain features used without other features, without departing from the spirit of the invention. Reference is, therefore, to be had to the appended claims for a definition of said invention.

What is claimed is:

1. In an expansion joint, the combination of relatively movable members adapted to be respectively connected to pipe sections, a flexible tubular wall with its opposite ends having fluid-tight joints with said members, said flexible wall being exteriorly subjected to the pressure of the fluid confined by said joint, and coacting means on said relatively movable members for preventing relative rotation between said relatively movable members when said joint is in operation.

2. In an expansion joint, the combination of relatively movable members adapted to be respectively connected to pipe sections, a flexible tubular wall with its opposite ends having fluid-tight joints with said members, said flexible wall being exteriorly subjected to the pressure of the fluid confined by said joint, and means for guiding and limiting the relative axial movement of said relatively movable members when said joint is in operation.

3. In an expansion joint, the combination of relatively movable members adapted to be respectively connected to pipe sections, a flexible tubular wall with its opposite ends making fluid-tight joints with said members, said flexible wall being exteriorly subjected to the pressure of the fluid confined by said joint, and means for guiding and limiting the relative axial movement of said relatively movable members when said joint is in operation, said means comprising axially and circumferentially extending ribs on one of said members and grooves in other of said members coacting with said axially extending ribs.

4. In an expansion joint, the combination of relatively movable members adapted to be respectively connected to pipe sections, a flexible tubular wall with its opposite ends having fluid-tight joints with said members, said flexible wall being exteriorly subjected to the pressure of the fluid confined by said joint, means adjacent one end of said flexible wall for guiding said members and maintaining said members in axial alignment, and a packed joint adjacent the opposite end of said flexible wall for maintaining said members in axial alignment.

5. In an expansion joint, a housing, a pipe section extending into said housing in telescopic relation thereto, a flexible tubular wall within said housing and surrounding said pipe section, said flexible wall being subjected only exteriorly to the pressure of the fluid confined by said joint, means for securing said flexible wall to said housing, and means for securing said flexible wall to the inner end of said pipe section comprising members provided with conical surfaces adapted to grip the extremity of said flexible wall therebetween.

6. In an expansion joint, a housing, a pipe section in telescopic relation thereto, a flexible tubular wall interposed between said housing and said pipe section, means for securing said flexible wall to said housing, and means for securing said flexible wall to said pipe section comprising a head adapted to reciprocate in said housing and a head secured to said pipe section, said heads being provided with opposed conical surfaces adapted to grip the end of said flexible wall therebetween.

7. In an expansion joint, a housing, a pipe section in telescopic relation thereto, a flexible tubular wall interposed between said pipe section and said housing, means for securing said flexible wall to said housing, and means for securing said flexible wall to said pipe section comprising a head adapted to reciprocate in said housing, a head secured to said pipe section, said heads having opposed conical surfaces adapted to grip the end of said flexible wall, and a nut on said first-named head for forcing said conical surfaces into gripping contact with said flexible wall.

8. In an expansion joint, a housing, a pipe section in telescopic relation thereto, a head secured to said pipe section and adapted to reciprocate within said housing, a flexible tubular wall surrounding said pipe section throughout the length of said flexible wall having its opposite ends detachably secured to said head and said housing, and means for preventing relative rotation between said head and housing.

9. In an expansion joint, a housing, a pipe section in telescopic relation thereto, a head secured to said pipe section and adapted to reciprocate within said housing, a flexible tubular wall surrounding said pipe section throughout the length of said flexible wall having its opposite ends detachably secured to said head and said housing, and rib and groove means between said head and housing.

10. In an expansion joint, a housing, a pipe section in telescopic relation thereto, a head secured to said pipe section and adapted to reciprocate within said housing, a flexible tubular wall having its opposite ends secured to said head and said housing, axially extending ribs in said housing, said head being provided with peripheral grooves to receive said ribs, and a circumferential rib at the extremity of said axial ribs to limit the axial movement of said head.

11. In an expansion joint, a housing, a pipe section in telescopic relation thereto, a head on said pipe section slidably mounted for axial movement in said housing, a flexible tubular wall having fluid-tight joints with said head and said housing and interposed therebetween, said flexible wall being exteriorly subjected to the pressure of the fluid confined by said joint, and a packed joint between the said housing and pipe section for sealing the chamber between said flexible wall and said pipe section.

In testimony whereof I have signed this specification.

JEAN V. GIESLER.